(No Model.)
T. R. CRANE.
FEED DEVICE FOR GRAIN DRILLS.
No. 363,604. Patented May 24, 1887.
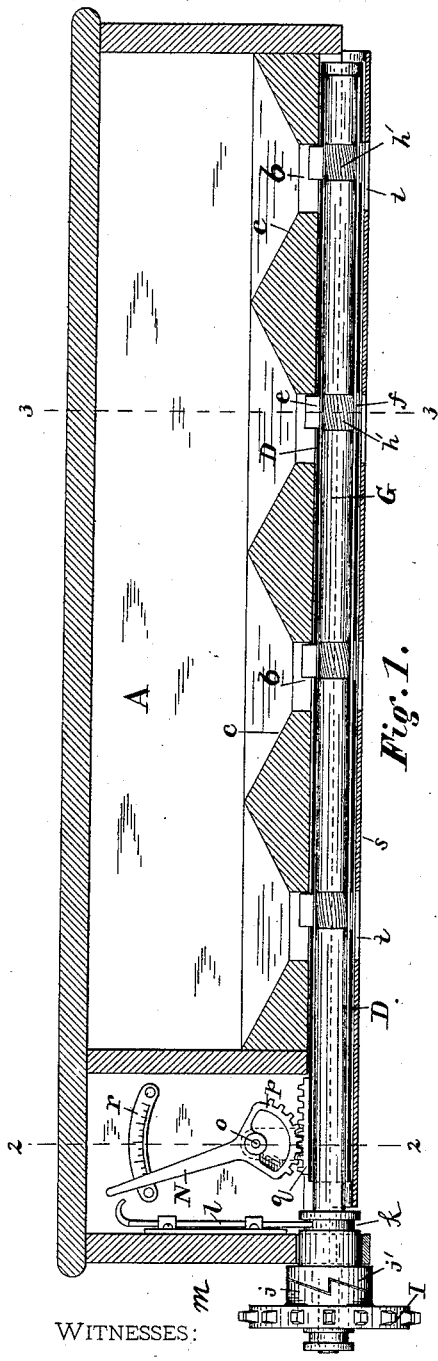
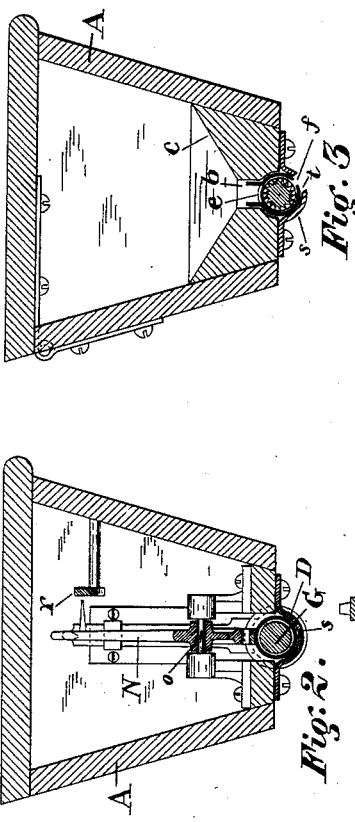
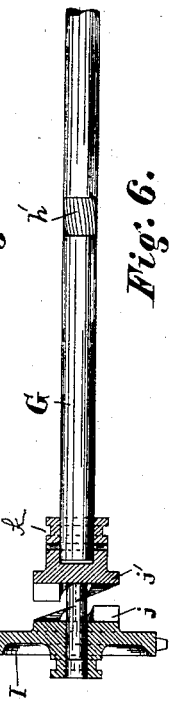
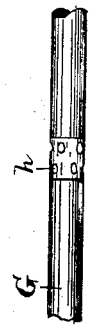
WITNESSES:
J. K. E. Diffenderffer
John E. Morris.
INVENTOR:
Thos. R. Crane
BY Chas. B. Mann
ATTORNEY.

UNITED STATES PATENT OFFICE.

THOMAS R. CRANE, OF HEATHSVILLE, VIRGINIA.

FEED DEVICE FOR GRAIN-DRILLS.

SPECIFICATION forming part of Letters Patent No. 363,604, dated May 24, 1887.

Application filed February 18, 1887. Serial No. 228,038. (No model.)

*To all whom it may concern:*

Be it known that I, THOMAS R. CRANE, a citizen of the United States, residing at Heathsville, in the county of Northumberland and State of Virginia, have invented certain new and useful Improvements in Feed Devices for Grain-Drills, of which the following is a specification.

My invention relates to an improved feed device for grain or seed.

The object of the invention is to provide a new feed device which may have its adjustment easily changed, so as to pass or discharge any desired quantity of grain or seed, and which will pass the quantity for which it may be set with regularity.

Referring to the accompanying drawings, which illustrate the invention, Figure 1 is a longitudinal vertical section of a grain or seed hopper, such as is usually mounted on drills. Fig. 2 is a cross-section of the hopper on the line 2 2. Fig. 3 is a cross-section of the hopper on the line 3 3. Figs. 4 and 5 show cross-sections of the feed-shaft and illustrate variations in the size of the feed-serrations. Fig. 6 is a longitudinal view of the feed shaft, showing serrations and a sectional view of the driving mechanism. Fig. 7 shows the feed-shaft provided with round grain-recesses.

The hopper A has openings *b* in its bottom, and preferably is funnel-shaped, as at *c*, around each opening. A tube, D, extends the entire length below the hopper-bottom, and has two openings, *e* and *f*. Said openings in pairs, one being above the other, occur at intervals along the tube at such distance apart as will coincide in point of location with the discharge-openings *b* in the hopper-bottom. This feed-tube is so arranged as to permit it to be moved endwise back and forth, thereby to increase or diminish the capacity of the grain-discharge openings. Suitable means are provided for adjusting or moving this tube. A shaft, G, extends through the entire length of the tube. This shaft has at intervals along its length zones of grain-depressions, which may be round recesses *h* or serrations *h'*. One zone is located at each pair of feed-openings *e f* in the tube. The serrations *h'* extend preferably diagonally with respect to the length of the feed-shaft; but they may be parallel with the axis of said shaft. I deem the diagonal position, however, of advantage. The feed-shaft has at one end mechanism for turning it. Any suitable mechanism may be used for this purpose. In the present instance a sprocket-wheel, I, turns loosely on the end of the said shaft, and a simple clutch device, *j j'*, of well-known construction, and readily understood by reference to the drawings, has one of its parts, *j*, on the sprocket-wheel, and the other part, *j'*, fixed rigidly on the feed-shaft. By means of this sprocket-wheel and clutch the feed shaft may, by a chain passed over the sprocket-wheel, be driven when the movement of the machine is in the right direction, but will remain at rest when the machine is moved in the opposite direction.

The feed-shaft has adjacent to the clutch a collar with a peripheral groove, *k*, and a bolt, *l*, is attached to the end *m* of the hopper, and is adapted to slide up or down and have its lower end take in the said collar-groove *k*, and by engagement therewith confine the feed-shaft to its position in the tube. By raising the bolt *l* from the collar-groove the entire feed-shaft may be drawn out of the tube and another one having serrations of different size or different feed capacity may be inserted. Thus the same tube serves for various feed-shafts suited to force different kinds of grain or seed through the discharge-openings.

The feed-tube D and the feed-shaft G within the tube are supported up against the hopper-bottom by a plate, *s*, secured to said bottom. This plate has openings *t* in proper position below each pair of discharge-openings in the tube.

A lever, N, is employed to adjust the tube endwise. This lever is pivoted at *o*, and has a sector end provided with cog-teeth *p*, which engage with a rack, *q*, on the feed-tube. An indicator-plate, *r*, is attached to the side of the hopper, and the free end of the lever N moves past said indicator. It will thus be seen the size of the openings for the discharge of the grain are diminished or increased by simply moving the lever N.

For small grain the serrations *h'* are preferable; but for corn, peas, and the like the recesses *h'* are preferred.

Having described my invention, I claim and desire to secure by Letters Patent of the United States—

1. In a grain or seed feeding device, the combination of a tube, D, below the hopper-bottom, provided with pairs of openings occurring at intervals, each pair consisting of an opening, e, in the upper side, and opening f in the lower side, and a feed-shaft, G, extending through the tube and provided at intervals coincident with the openings in the said tube with zones of grain-depressions, for the purpose set forth.

2. In a grain or seed feeding device, the combination of a tube, D, below the hopper-bottom, provided with pairs of openings occurring at intervals, means, substantially as described, to move said tube endwise back and forth, a feed-shaft, G, extending through the tube and provided at intervals coincident with the openings in the said tube with zones of grain-depressions, and means for turning the said feed-shaft in the tube, for the purpose set forth.

In testimony whereof I affix my signature in presence of two witnesses.

THOMAS R. CRANE.

Witnesses:
 JOHN E. MORRIS,
 JNO. T. MADDOX.